United States Patent
Mount

[11] 3,744,942
[45] July 10, 1973

[54] ROTARY SLIDING VANE COMPRESSOR WITH HYDROSTATIC BEARINGS

[75] Inventor: Alfred G. Mount, York, Pa.

[73] Assignee: Borg-Warner Corporation, Chicago, Ill.

[22] Filed: July 16, 1971

[21] Appl. No.: 163,194

[52] U.S. Cl. .................. 418/76, 418/77, 418/81, 418/88, 418/94, 418/99
[51] Int. Cl. .... F01c 21/00, F01c 21/04, F04c 29/02
[58] Field of Search .................. 418/83, 88, 91–94, 418/97–99, 76, 77, 81

[56] References Cited
UNITED STATES PATENTS

| | | | |
|---|---|---|---|
| 2,975,964 | 3/1961 | Osterkamp | 418/88 |
| 2,801,791 | 8/1957 | Walter | 418/93 |
| 3,016,184 | 1/1962 | Hart | 418/99 |
| 1,573,683 | 2/1926 | Diffinger | 418/88 |
| 1,635,006 | 7/1927 | Oliver | 418/93 |
| 1,834,976 | 12/1931 | Schmidt | 418/88 |
| 2,737,341 | 3/1956 | Bitzer | 418/88 |

Primary Examiner—Carlton R. Croyle
Assistant Examiner—John J. Vrablik
Attorney—Donald W. Banner et al.

[57] ABSTRACT

A pair of oil-filled hydrostatic bearing cavities, respectively on the two sides of the compressor's rotor near its axis, effect automatic centering or balancing of the rotor between the end walls or plates of the cylindrical chamber in which it is eccentrically rotated. Separate and independent flow paths convey pressurized oil from a common oil source and through parallel flow control orifices to the bearing cavities, after which the oil flows radially outward along the two rotor faces and through restrictive clearances between those faces and the adjacent end walls to the compression chamber where it entrains into the gas. If the rotor tends to shift axially from its centered position, one of the clearances reduces thereby increasing the oil pressure drop along that face while the other clearance increases and this lowers the pressure drop along that side of the rotor. As a result of the changing pressure drops, the oil pressure increases in the bearing cavity on the decreasing-clearance side while at the same time the pressure decreases in the cavity on the increasing-clearance side. A compensating or corrective force thus develops to reposition the rotor to its centered location, whereupon the oil pressures in the cavities assume appropriate levels to maintain such centering.

8 Claims, 3 Drawing Figures

Patented July 10, 1973

INVENTOR
ALFRED G. MOUNT
BY James E. Tracy
ATTORNEY

Patented July 10, 1973

INVENTOR
ALFRED G. MOUNT
BY James E. Tracy
ATTORNEY

ROTARY SLIDING VANE COMPRESSOR WITH HYDROSTATIC BEARINGS

BACKGROUND OF THE INVENTION

This invention relates generally to a rotary compressor of the sliding vane type and more particularly to a system for controlling the oil pressures in hydrostatic bearings to maintain the compressor's rotor centrally located. It is especially attractive when incorporated in a rotary sliding vane compressor adapted for use in an automotive air-conditioning system and will be described in that environment.

Relatively small clearances, through which lubricating oil flows, are usually provided between the rotor faces and end walls in a rotary compressor in order to minimize friction, heat and wear. The oil also seals the high and low pressure sides of the compressor from each other to minimize leakage and thereby to enhance the efficiency. Since the rotor is ordinarily axially movable to a very small extent, it is desirable to center that rotor between the end walls to avoid metal-to-metal contact and consequently unnecessary wear. In addition, such centering maximizes the isolation of the high and low pressure sides from each other, since a relatively large clearance adjacent one of the rotor faces would present a leakage path.

Rotor centering has been achieved in the past by the use of oil-filled hydrostatic bearing cavities establishing equal oil pressures and balanced forces on the two rotor faces. The prior approaches have not, however, been entirely successful in instantly responding and creating an opposing compensating force when the rotor tends to de-center under the influence of some external axial force applied to the rotor through its drive shaft. The present invention constitutes an improvement over the previously developed hydrostatic centering arrangements by providing a rotary compressor wherein the slightest movement of the rotor away from its centered or "home" position instantly results in the development of an opposing force which recenters the rotor. Moreover, the rotor may be subject to a constant axial force and appropriate unbalanced forces will be exerted on the rotor sides by the oil pressures in the hydrostatic bearings to effect centering.

It is, therefore, an object of the invention to provide a unique arrangement for centering the rotor in a rotary sliding vane compressor.

It is another object to provide a more efficient rotary compressor with improved sealing properties and enhanced immunity of the moving parts against wear.

SUMMARY OF THE INVENTION

The rotary sliding vane compressor of the invention comprises a casing which defines a closed cylindrical chamber having a cylindrical wall and spaced first and second parallel end walls. A slotted rotor is rotatably mounted eccentrically in the cylindrical chamber to provide, with the cylindrical wall and the end walls, a crescent-shaped compression chamber. The rotor has first and second rotor faces adjacent and parallel to the first and second end walls respectively. A relatively small amount of axial movement of the rotor may occur between the end walls. Suction and discharge ports communicate with the compression chamber. A plurality of vanes, slidably mounted or retained in the slots of the rotor, engage the cylindrical wall to compress a gaseous fluid introduced through the suction port and to discharge that fluid through the discharge port at a higher pressure. There is a source of pressurized lubricating oil. Finally, the compressor comprises first and second parallel and independent oil flow paths each coupled from the oil source to the compression chamber. The first flow path includes in series a first flow control orifice, a first hydrostatic bearing cavity defined between the first rotor face and first end wall, and a first restrictive clearance between the first face and first wall and located radially outward from the first cavity. The second flow path includes in series a second flow control orifice, a second hydrostatic bearing cavity defined between the second rotor face and second end wall, and a second restrictive clearance between the second face and second wall and located radially outward from the second cavity. The oil pressure in each of the first and second bearing cavities varies inversely with changes in the first and second clearances respectively, which occur when the rotor shifts axially, thereby to effect automatic centering of the rotor between the end walls.

DESCRIPTION OF THE DRAWINGS

The features of the invention which are believed to be novel are set forth with particularity in the appended claims. The invention, together with further objects and advantages thereof, may best be understood, however, by reference to the following description in conjunction with the accompanying drawings in which like reference numbers identify like elements, and in which:

DESCRIPTION OF THE ILLUSTRATED EMBODIMENT

Figure 1:
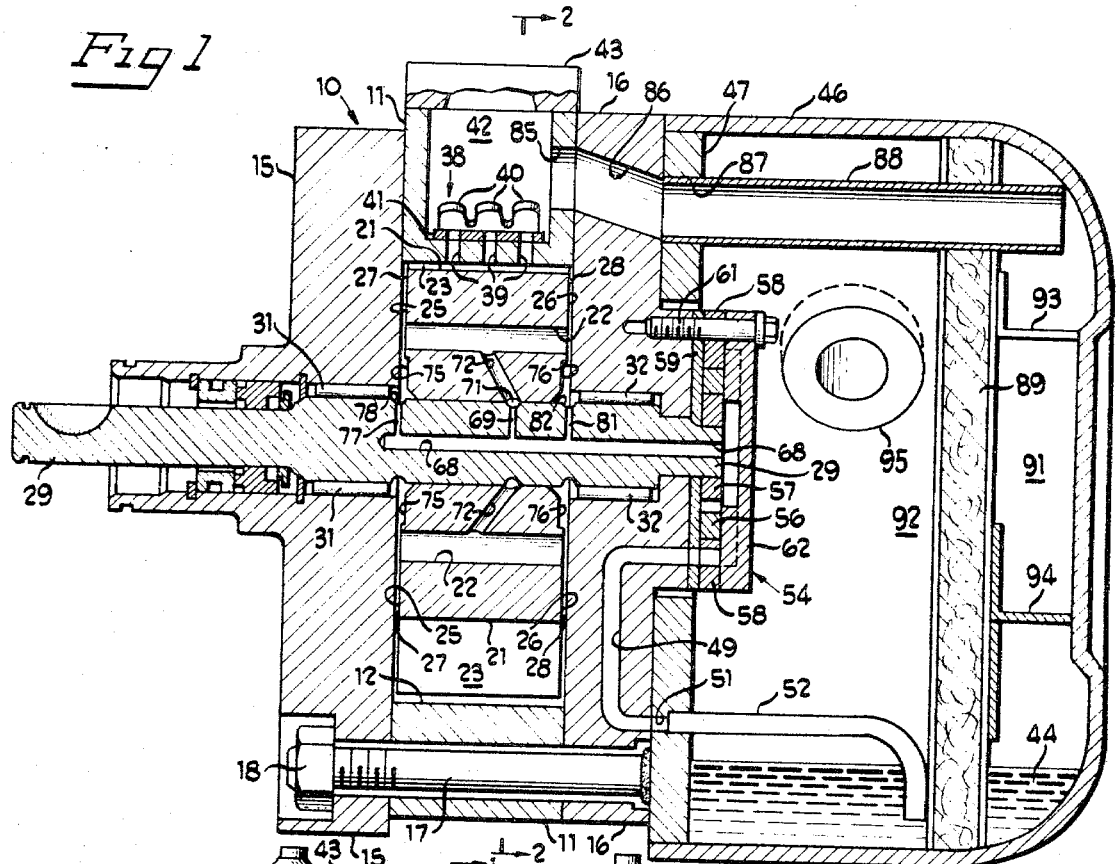
FIGS. 1 and 2 are different sectional views of a rotary sliding vane compressor constructed in accordance with the present invention, the FIG. 1 view being taken along section line 1—1 in FIG. 2 while the sectional view of FIG. 2 is taken along section line 2—2 in FIG. 1; and, FIG. 3 is an enlarged, exploded view in perspective, with some elements in cross section, illustrating a portion of the rotary compressor.

The disclosed compressor has a casing 10 which includes a cylinder structure 11 having a cylindrical bore or wall 12 extending therethrough, a front bearing plate 15, and a rear bearing plate 16, all secured together by a series of six studs 17 and nuts 18, only one of which nuts is shown in FIG. 1. Casing 10 provides a closed cylindrical chamber or cavity formed by cylindrical wall 12 and bearing plates 15 and 16 which serve as spaced parallel end walls for the chamber. A rotor assembly 20 (see FIG. 2) is rotatably mounted eccentrically in that cylindrical chamber and includes a slotted rotor 21 having a series of four slots 22 arranged circumferentially and each extending along a plane parallel to the rotor's axis. The closed end of each slot, for convenience, may be referred to as the bottom end. Each of a series of four reciprocating vanes 23 is slidably mounted in a respective one of slots 22. The eccentric positioning of rotor assembly 20 is obtained by rotatably mounting rotor 21 on an axis offset with respect to the axis of wall 12. Such eccentric mounting creates a crescent-shaped compression chamber 24 between rotor 21, wall 12, and the two end walls or bearing plates 15 and 16.

Rotor 21 and casing 10 are made so that the dimension between the parallel rotor faces 25 and 26 is slightly less than the spacing between end walls 15 and 16. In this way, small restrictive clearances identified by the reference numbers 27 and 28 are established between the rotor faces and end walls to permit rotor 21 to rotate freely within the cylindrical chamber without any metal-to-metal contact, thereby minimizing friction, heat and wear on the moving parts. Of course, in actual practice clearances 27 and 28 are not as large as shown in FIG. 1. They have not been drawn to scale in order to facilitate a better understanding of the operation of the invention.

Rotor 21 has a drive shaft 29 journaled in bearings 31 and 32 affixed to bearing plates 15 and 16 respectively. The left end of shaft 29 (as viewed in FIG. 1) projects outwardly of front bearing plate 15 so that the shaft may be driven. Since the illustrated embodiment is especially adapted for automotive use, it is comtemplated that a V-belt pulley and clutch mechanism (not shown) would be coupled to the left end of shaft 29 to permit the compressor to be driven by the engine fan belt or accessory drive belt of the automobile. The disclosed compressor may, of course, be employed in many different environments and may be used in other than refrigeration or air-conditioning systems to compress a variety of different gaseous fluids. Whatever the driving means, it may conveniently be coupled to drive shaft 29.

While shaft 29 and rotor 21 are fixed with respect to each other, a small amount of axial movement of those elements may occur within the limits defined by the separation between end walls 15 and 16. As illustrated in FIG. 1, rotor 21 is centered between walls 15 and 16 and, accordingly, clearances 27 and 28 are equalized. The manner in which the equalization of the clearances is retained in the presence of axial forces tending to de-center rotor 21 will be described later.

Figure 2:
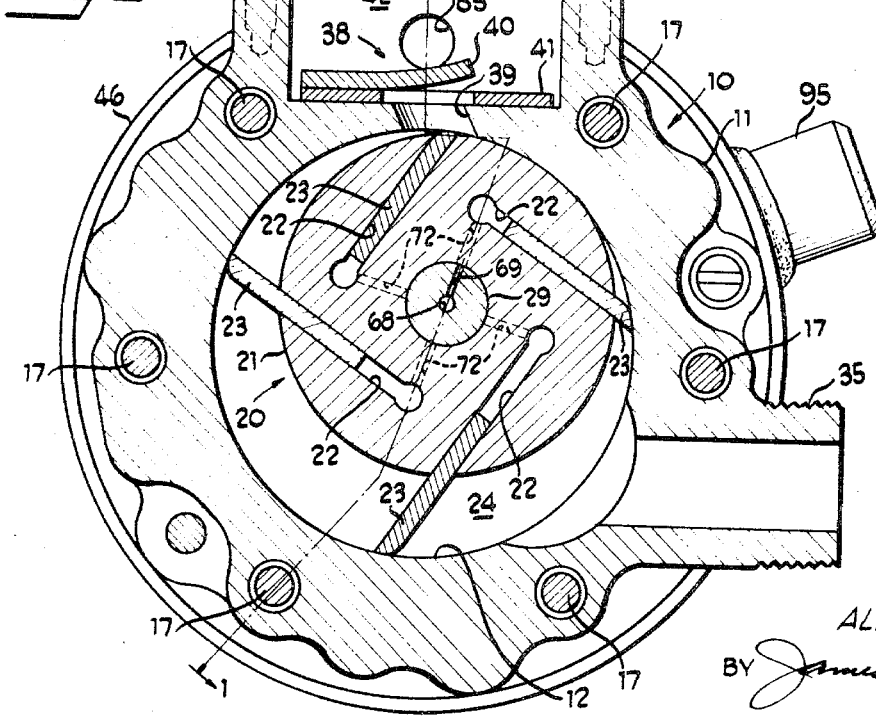

The compressor is designed to operate when rotor assembly 20 revolves in a clockwise direction as viewed in FIG. 2, during which time vanes 23 firmly bear against cylindrical wall 12 and establish a fluid-tight, sealed connection thereto. In operation, suction refrigerant gas from the evaporator of the automotive air-conditioning system is admitted to an inlet 35 formed in cylinder structure 11. As is illustrated in FIG. 2, this refrigerant gas flows into the suction portion of compression chamber 24. As the rotor is driven clockwise, the gas is trapped between two adjacent vanes 23 and carried forward toward the discharge area. As this occurs, the volume between the adjacent vanes is reduced thereby resulting in a corresponding increase in pressure of the gas. A discharge valve assembly 38 is located in the discharge zone for assuring proper compression of the gases issuing from a series of three outlet or discharge ports 39, bored in cylindrical structure 11, and for preventing reverse flow of gases back into compression chamber 24. The valve assembly 38 is of the reed type comprising the three valve reeds 40 and the valve seat 41. The compressed refrigerant gas emanating from ports 39 flows into a chamber 42 defined by cylinder structure 11 and a cover plate 43.

The processing of the high pressure gas after it is delivered to chamber 42 will be considered later. At this juncture it is desirable to describe the lubricating system in the compressor. Briefly, pressurized oil is supplied to all of the moving components and bearing surfaces, including the rotor faces and adjacent end walls, to provide proper lubrication and to seal the high and low pressure sides of the compressor from each other. In addition, oil is delivered to the bottom ends of slots 22 to force vanes 23 outwardly and toward wall 12. The oil supplied between the rotor faces and end walls effects centering in accordance with the invention.

Figure 3:
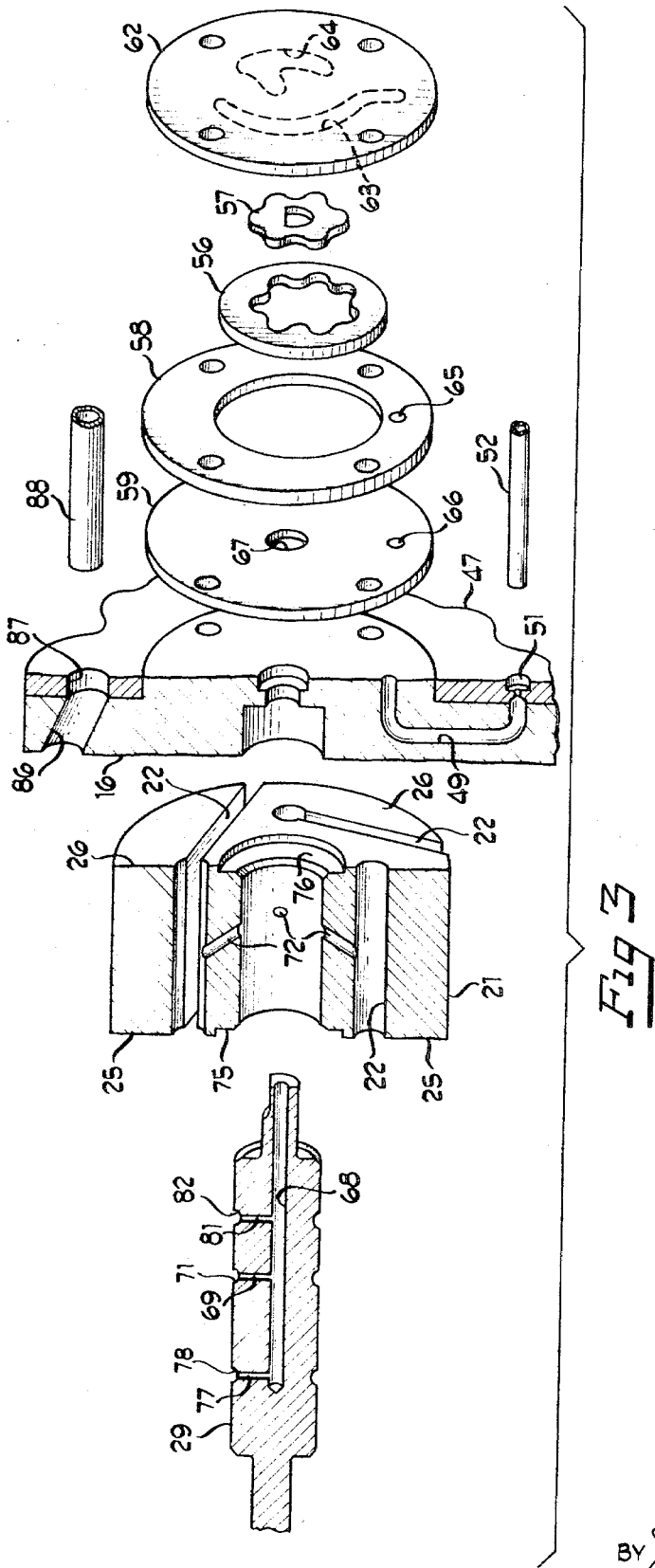

More particularly, a reservoir of oil or sump 44 is provided in the lower portion of a shell 46, the open end of which is attached and hermetically sealed to a mounting ring 47 in turn affixed and sealed to rear bearing plate 16. Oil passages 49 and 51, formed in plate 16 and mounting ring 47 respectively, and pickup tube 52 establish a flow path between the oil sump and the inlet of an oil pump 54, shown in detail in the exploded view of FIG. 3.

The oil pump is of the conventional internal gear-type having a freely rotatable internally-toothed outer gear 56 driven by an externally-toothed inner gear 57 eccentrically positioned within gear 56. More specifically, the right end of drive shaft 29 projects outwardly from casing 10 and is keyed to inner gear 57 to drivingly connect the shaft to the gear. Outer gear 56 is mounted for free rotation on an axis spaced or offset from that of shaft 29 and inner gear 57 by means of an eccentric bearing ring 58 rigidly affixed to but separated by a spacer 59 from plate 16 by means of four cap screws 61, only one of which is shown in FIG. 1. Inner gear 57 has one less tooth than gear 56 and a pluarality of separate pumping chambers are effectively defined between those gears. Cover plate 62, also held in place by the four cap screws, has a pair of arcuate cutaway or recessed cavities 63,64 to provide inlet and outlet passages for oil pump 54. Cavity 63 has a vertically depending leg which communicates through holes 65 and 66, in ring 58 and spacer 59 respectively, to the upper end of passage 49 formed in end wall 16. Hence, a flow path exists between sump 44 and the inlet of the oil pump. Cavity 64, on the other hand, has a laterally projecting portion extending to the central area of cover plate 62 to fluidly connect the pump outlet to the axially extending bore 68 in drive shaft 29.

In operation of oil pump 54, as drive shaft 29 is driven inner gear 57 likewise rotates and one portion of each inner gear tooth is always in sliding sealing contact with a portion of an outer gear tooth to maintain the pumping chambers sealed from each other. The chambers effectively revolve about the axis of shaft 29 and each progressively increases to a maximum volume and then decreases to a minimum volume. Passage or inlet port 63 is located so that it communicates with the chambers that are increasing in volume, while outlet port 64 fluidly couples to those chambers that are decreasing in volume. Pressurized oil is thus delivered to axial bore 68. It has a relatively large cross section so that oil may flow through its entire length without appreciably dropping in pressure. Since the oil pressure is the same throughout passage 68, it may be considered as a source of pressurized oil.

A single radially extending passage 69 in shaft 29 couples oil source 68 to a circumferential annular groove 71 which in turn communicates via a series of four radially extending passages 72 formed in rotor 21 to the bottom ends of slots 22. With this construction, the high pressure oil exiting from the oil pump is delivered to the slots behind vanes 23 thereby to impel the vanes toward and in sealed engagement with cylindrical wall 12. The magnitude of the oil pressure is set so that during start-up the pressurized oil along will be sufficient to cause the vanes to move out of their slots and establish fluid-tight connections with the cylindrical wall. Preferably, the pressure level will be just adequate to make the required sealed contact between the vane tips and cylindrical wall, but yet will not cause undue strain on the vanes and needless wear.

Since the oil pump is driven by drive shaft 29, the oil pressure fed to slots 22 would normally tend to increase linearly as the rotor speed increases. In the illustrated compressor, the rate at which the oil pressure increases with RPM is reduced so that the pressure tends to level off to a constant magnitude. This is desirable inasmuch as centrifugal force, which also acts to push each of the vanes against wall 12, increases with RPM. By effectively limiting the extent to which the oil pressure increases from start-up to maximum rotor speed, the total force (as contributed by both the oil pressure and by centrifugal action) holding each of the vanes against the cylindrical wall may be maintained within a relatively narrow acceptable range and will never be excessive. The upper limit of the range, which prevails at maximum speed, will be less than that which would cause undue strain, friction and wear on the vanes.

The rate, at which the oil pressure in the bottom of slots 22 would otherwise increase as speed increases, is reduced by decreasing the efficiency of oil pump 54 with RPM. This is achieved, in accordance with the teachings of copending application Ser. No. 160,694 filed July 8, 1971 in the name of Lester E. Harlin, by sizing or dimensioning the passageway extending between oil sump 44 and the pump inlet in order to cause cavitation, the amount of which increases with rotor speed. In other words, during high speed operation oil cannot flow into the pump fast enough, thus effecting a vacuum or void in the pump which gives rise to a reduction in the rate of oil pressure increase as speed increases. The faster the operation, the greater will be the vacuum created and the smaller will be the rate of pressure increase.

Automatic centering of rotor 21 is accomplished in accordance with the present invention by embracing the rotor with a pair of hydrostatic bearings the pressure in each of which varies, anytime the rotor shifts off center, in a compensating sense to return the rotor to its home or center position. The hydrostatic bearing cavities are defined between rotor faces 25 and 26 and their adjacent end walls 15 and 16 respectively. They may constitute recesses or depressions formed in either the faces or walls or in both. In the illustrated case the bearing cavities, denoted by reference numerals 75 and 76, are annular shaped, are relatively close to the rotor's axis, and are formed in rotor faces 25 and 26. Oil flows to cavity 75 from source or oil passage 68 by way of radially extending bore 77 and circumferential annular groove 78 in shaft 29. Similarly, radially extending passage 81 and circumferential groove 82 in shaft 29 communicate oil source 68 to hydrostatic bearing cavity 76. Passages 77 and 81 have relatively small cross sections so that they will function as flow control orifices. In this way, the oil flow to each of cavities 75 and 76 experiences a substantial pressure drop in the associated orifice 77, 81.

After reaching cavity 75, the oil then flows radially outward along rotor face 25 and through restrictive clearance 27 to compression chamber 24. By the same token, oil flows out of bearing cavity 76 and radially outward along rotor face 26 and through restrictive clearance 28 to the compression chamber. There are thus two parallel and independent oil flow paths from oil source 68 to compression chamber 24, one path including in series and in the order named flow control orifice 77, bearing cavity 75 and clearance 27, while the other flow path comprises in series flow control orifice 81, cavity 76 and clearance 28. While no significant pressure drop occurs in cavities 75 and 76, appreciable pressure drops will be experienced by the oil flow through each of clearances 27 and 28. The magnitude of each pressure drop will be inversely proportional to the size of the clearance. In other words, the closer a rotor face is to its adjacent end wall, the greater will be the resistance presented to the oil flow and the greater will be the pressure drop imparted to the oil in flowing through that clearance.

A hydrostatic force is produced in each cavity 75, 76 depending on the lubricant pressure in the cavity and the area of the cavity. Orifices 77 and 81 and cavities 75 and 76 may be dimensioned and shaped so that under normal conditions equal pressure drops occur in the orifices and in the two clearances, as a result of which equal pressures and hydrostatic forces are established in the cavities to center rotor 21 between end walls 15 and 16, as illustrated in FIG. 1. If the rotor tends to move away from its centered location (due, for example, to some external axial force upon shaft 29), the pressure drop increases in one clearance and at the same time reduces in the other such that the rotor is forced back to its home position. To elucidate, assume that rotor 21 tends to move to the right. In that case, clearance 28 becomes smaller while clearance 27 enlarges. Accordingly, an increased pressure drop occurs in clearance 28 and a decreased pressure drop is introduced in clearance 27. Since the pressures are the same where the oil emerges from the two clearances (namely, at the radially outermost portions of the rotor faces) and flows into the compression chamber, increased and decreased pressure drops in clearances 28 and 27 respectively means that the pressure in cavity 76 must increase while that in cavity 75 decreases. Rotor 21 will thus be forced back to its central location whereupon the forces on the rotor will once again be balanced.

While in the illustrated embodiment the two flow paths controlling rotor positioning are identical, giving rise to equalization of the pressures in cavities 75 and 76 when the rotor is centered, such identity is not necessary and in certain environments would not be desirable. As an example, some clutches employed to drivingly connect a fan or accessory belt to shaft 29 may impart a slight but constant axial force to the drive shaft. Under those circumstances, the flow control orifices and/or hydrostatic bearing cavities may be differently sized so that a greater force will be applied to the appropriate rotor face in order to overcome the constant axial force and maintain the rotor centered.

It is also to be appreciated that the passages supplying oil to cavities 75 and 76 need not be included in drive shaft 29. As one alternative, the oil paths may be routed through cylinder structure 11 and bearing plates 15 and 16.

The lubricant flowing through clearances 27 and 28 and into compression chamber 24 entrains into the refrigerant gas during compression, as a consequence of which the high pressure gas flowing through valve assembly 38 and into chamber 42 is heavily laden with oil. This entrained oil must be removed from the gas because substantial quantities of oil in the discharge gas reduces the heat transfer in the condenser and evaporator. In addition, it is much more difficult to supply a sufficient amount of oil to the compression chamber to attain the necessary sealing between the rotor and chamber surfaces.

Oil separation in the disclosed compressor takes place within shell 46. A passageway formed by bores 85, 86 and 87 in cylinder structure 11, plate 16 and mounting ring 47, respectively, together with tube 88 communicates chamber 42 to the extreme end of shell 46. Tube 88 extends through an oil separating filter screen 89 comprised of gas permeable material, such as coarse mesh metal fibers as in a scouring pad. The periphery of separator 89 has the same contour as that of the shell so that its edges fit against the internal diameter of the shell. In this way, separator 89 constitutes a partition to define two different chambers 91 and 92 within shell 46. Element 93 serves as a support bracket for separator 89, while element 94 constitutes a baffle.

In operation of the oil separator, the discharge gas together with the entrained oil flows out of chamber 42 and into chamber 91 through the conduit provided by bores 85, 86 and 87 and tube 88. At that point the velocity of the gas is greatly reduced as it expands into a much larger volume. In expanding, the gas strikes the end of shell 46 and reverses direction as a consequence of which most of the oil separates on the rear surface of the shell and flows down into sump 44. The gas with the remaining oil, after striking the shell and reversing its flow direction, now heads toward the front of the compressor passing through oil separator 89 where the residual oil coalesces and runs down into reservoir 44. The discharge gas flowing into chamber 92 will thus be oil-free. A discharge outlet 95 mounted on shell 46 permits the gas to flow out of chamber 92. Baffle 94 prevents the turbulent gas from reaching and stirring up oil pool 44 and re-entraining oil back into the gas.

The invention provides, therefore, a unique rotary sliding vane compressor having hydrostatic bearings for developing forces on the rotor to maintain it centrally located and balanced even in the presence of transient or constant axial forces tending to de-center the rotor.

While a particular embodiment of the invention has been shown and described, modifications may be made, and it is intended in the appended claims to cover all such modifications as may fall within the true spirit and scope of the invention.

I claim:

1. A rotary sliding vane compressor comprising:
    a casing defining a closed cylindrical chamber having a cylindrical wall and spaced first and second parallel end walls;
    a slotted rotor rotatably mounted eccentrically in said cylindrical chamber to provide, with said cylindrical wall and said end walls, a crescent-shaped compression chamber and having first and second rotor faces adjacent and parallel to said first and second end walls respectively, said rotor subject to a relatively small amount of axial movement between said end walls;
    suction and discharge ports communicating with said compression chamber;
    a plurality of vanes slidably mounted in the slots of said rotor for engaging said cylindrical wall to compress a gaseous fluid introduced through said suction port and to discharge that fluid through said discharge port at a higher pressure;
    a source of pressurized lubricating oil;
    and first and second parallel and independent oil flow paths each coupled from said oil source to said compression chamber, said first flow path including in series a first flow control orifice, a first hydrostatic bearing cavity defined between said first rotor face and first end wall, and a first restrictive clearance between said first face and first wall and located radially outward from said first bearing cavity, and said second flow path including in series a second flow control orifice, a second hydrostatic bearing cavity defined between said second rotor face and second end wall, and a second restrictive clearance between said second face and second wall and located radially outward from said second bearing cavity;
    the oil pressure in each of said first and second bearing cavities varying inversely with changes in said first and second clearances respectively, which occur when said rotor shifts axially, thereby to effect automatic centering of said rotor between said end walls.

2. A rotary sliding vane compressor according to claim 1 in which said first and second flow control orifices are similarly sized, wherein said first and second bearing cavities are similarly sized, and in which the oil pressures in said bearing cavities are equalized when said rotor is centered.

3. A rotary sliding vane compressor according to claim 1 in which said first and second bearing cavities are defined respectively in said first and second rotor faces.

4. A rotary sliding vane compressor according to claim 3 in which each of said bearing cavities is annular shaped and is relatively close to and coaxial with the rotor's axis.

5. A rotary sliding vane compressor according to claim 1 in which said first and second end walls are provided by front and rear bearing plates respectfully, wherein said rotor has a drive shaft journaled in said bearing plates, and in which said source of pressurized oil includes an axially extending bore in said drive shaft having a relatively large cross section so that the pressurized oil flows therethrough with no appreciable pressure drop.

6. A rotary sliding vane compressor according to claim 5 in which said first and second flow control orifices are both located in said drive shaft and fluidly interconnect said axially extending bore to said first and second bearing cavities respectively, each of said orifices having a relatively small cross section so that a substantial pressure drop is experienced as the pressurized oil flows therethrough and into the associated bearing cavity.

7. A rotary sliding vane compressor according to claim 5 and including an oil pump for supplying the pressurized oil into one end of said axially extending bore.

8. A rotary sliding vane compressor according to claim 7 in which said suction and discharge ports communicate respectively with suction and discharge portions of said compression chamber, and in which the oil flows through each of said flow paths to said compression chamber where it entrains into the gas during compression, and including an oil separator for removing the entrained oil from the compressed gas and for delivering the separated oil to the inlet of said oil pump.

* * * * *